May 1, 1934.  DE WITT L. SHELLY  1,956,700
DEVICE FOR MACHINING PISTON RINGS
Filed March 1, 1930  3 Sheets-Sheet 1

INVENTOR
DEWITT L. SHELLY
BY
ATTORNEY

May 1, 1934.    DE WITT L. SHELLY    1,956,700
DEVICE FOR MACHINING PISTON RINGS
Filed March 1, 1930    3 Sheets-Sheet 2
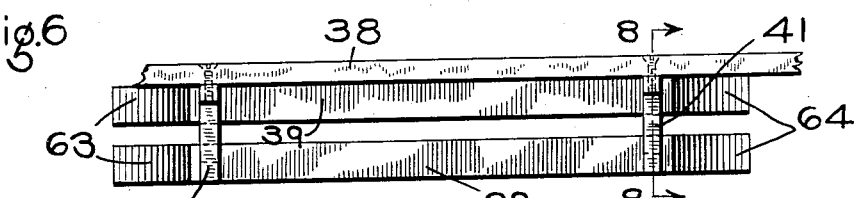
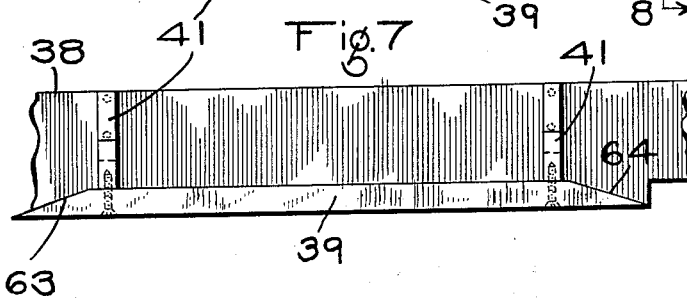
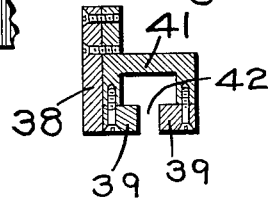
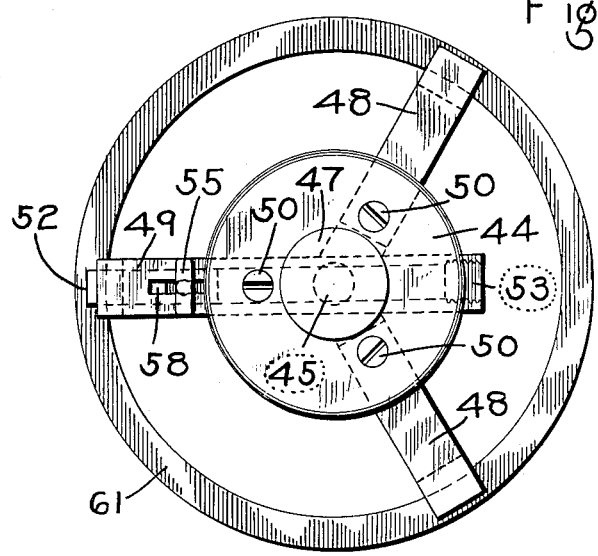
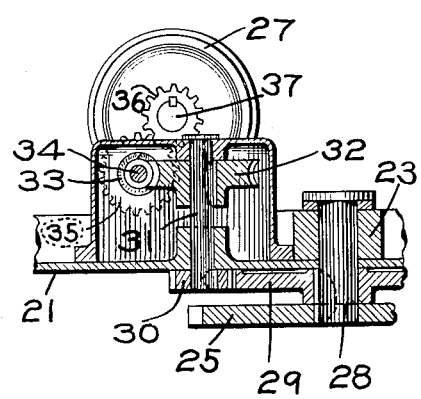
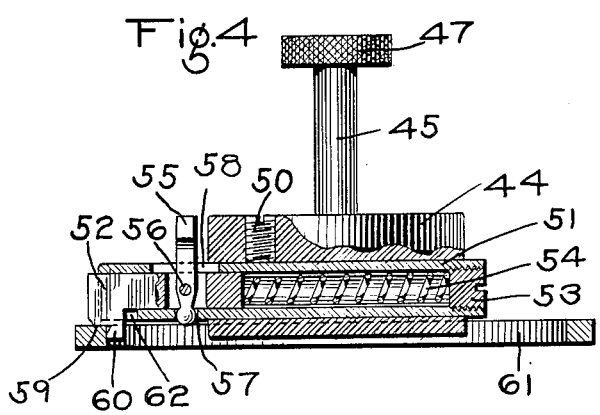
INVENTOR
DEWITT L. SHELLY
BY *Wm. M. Ready*
ATTORNEY May 1, 1934. DE WITT L. SHELLY 1,956,700
DEVICE FOR MACHINING PISTON RINGS
Filed March 1, 1930 3 Sheets-Sheet 3
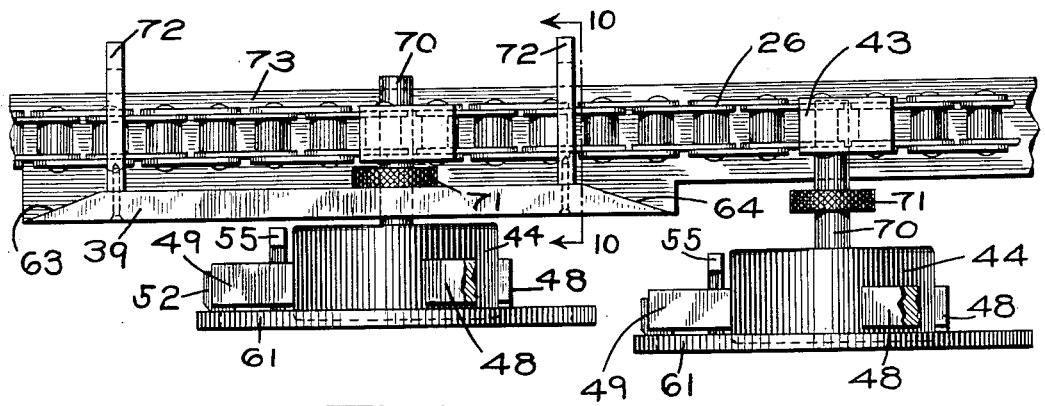
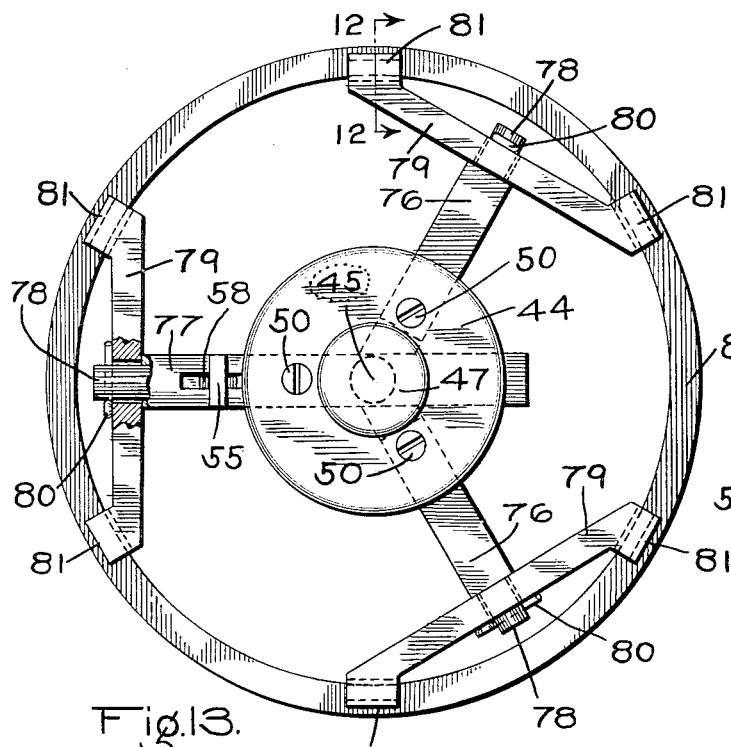
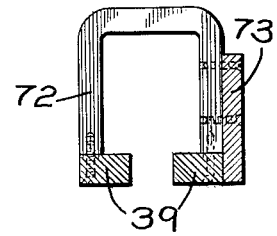
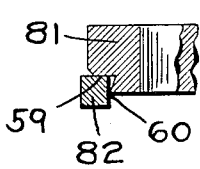
INVENTOR
DEWITT L. SHELLY
BY *Wm. M. Cady*
ATTORNEY Patented May 1, 1934

1,956,700

UNITED STATES PATENT OFFICE 1,956,700

DEVICE FOR MACHINING PISTON RINGS

De Witt L. Shelly, Wilmerding, Pa., assignor to The Westinghouse Air Brake Company, Wilmerding, Pa., a corporation of Pennsylvania Application March 1, 1930, Serial No. 432,354

6 Claims. (Cl. 51—110)

This invention relates to grinding machines, and more particularly to a grinding machine adapted to grind piston packing rings.

In an individually cast piston ring, the two sides of the ring are often more or less wavy after the casting process and when such a ring is placed in a magnetic chuck for machining, the magnetic pull on the ring tends to straighten out the waves. After one side of the ring is then machined to a true flat surface and the ring is released from the magnetic chuck, the ring tends to spring back to its original shape, so that the side of the ring which is machined flat, again assumes its wavy shape.

The principal object object of my invention is to eliminate the wavy condition on one side of an individually cast piston ring before placing it on a magnetic chuck for the machining operation, so as to obviate the above difficulty.

For this purpose I propose to provide a grinding machine which is adapted to eliminate the waves on one side of a piston ring, so that the ring may then be machined in the above described manner and produce a ring with flat sides.

Other objects and advantages will appear in the following more detailed description of the invention.

Figure 1:
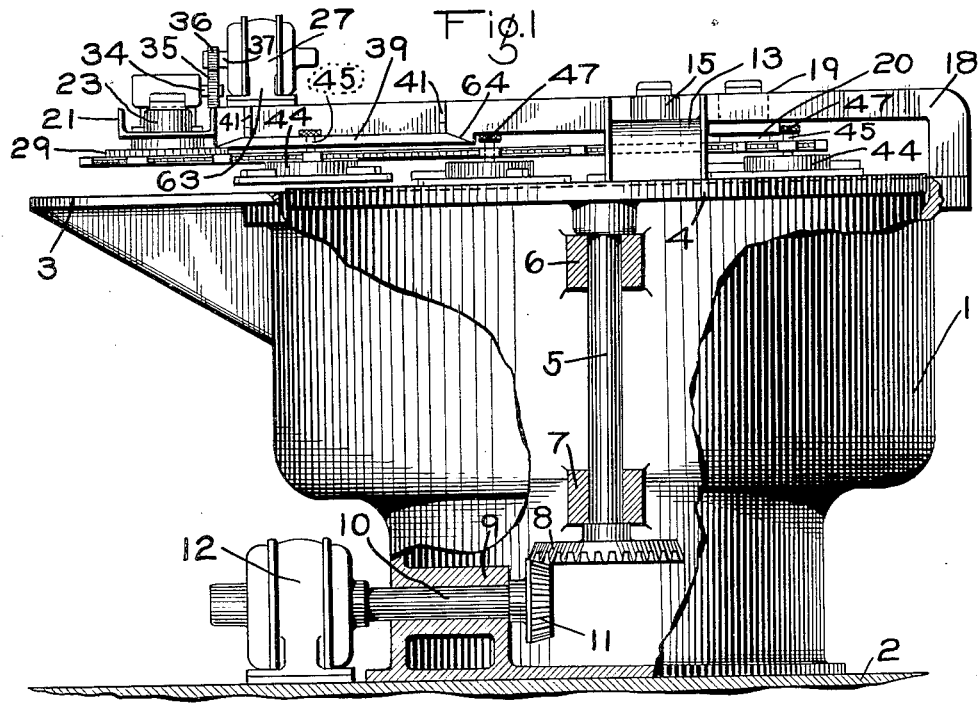
Figure 2:
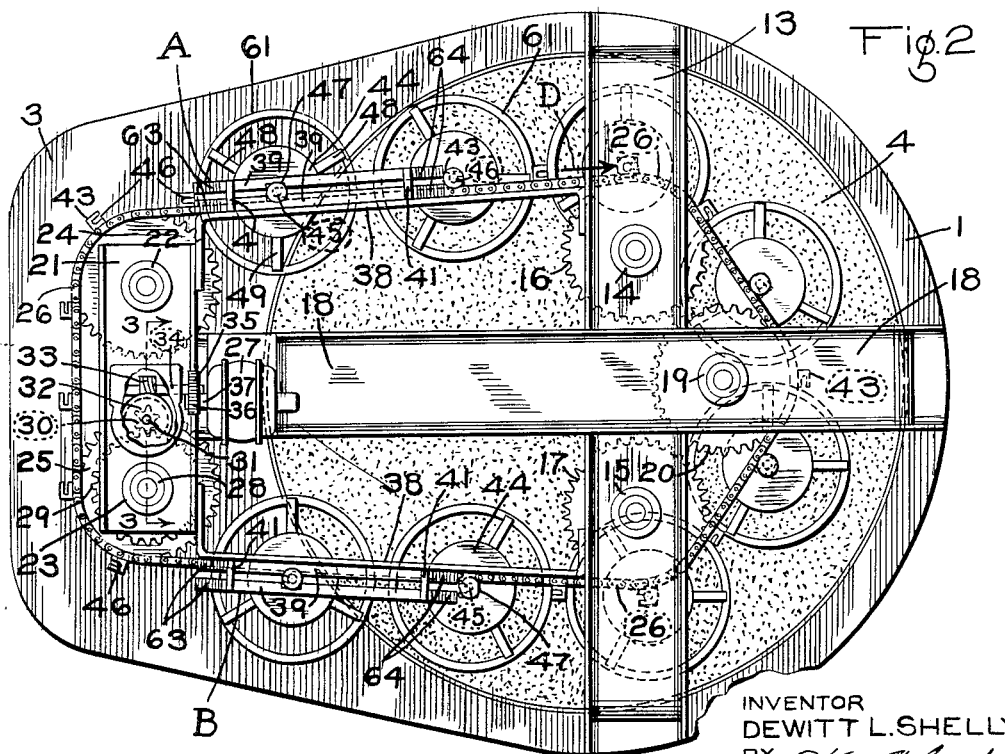

In the accompanying drawings; Fig. 1 is a side elevation of a grinding machine embodying my invention, a portion of the machine body being cut away so as to clearly show the interior working parts; Fig. 2 is a plan view of the grinding machine; Fig. 3 is a section taken on the line 3—3 of Fig. 2; Fig. 4 is an enlarged side elevation, partly in section, of a piston ring holder with ring; Fig. 5 is a plan view of the piston ring holder with ring, shown in Fig. 4; Fig. 6 is an enlarged plan view of a loading and unloading device; Fig. 7 is a side elevation of the loading and unloading device; Fig. 8 is a section of the loading and unloading device taken on the line 8—8 of Fig. 6; Fig. 9 is a side elevation of a modified form of my invention; Fig. 10 is a section of the modified form of the invention taken on the line 10—10 of Fig. 9; Fig. 11 is a plan view of a modified form of piston ring holder; Fig. 12 is a section of the piston ring holder taken on the line 12—12 of Fig. 11; and Fig. 13 is a side elevation of a portion of the machine body showing a modified form of table associated with said body.

As shown in the drawings, in which like reference numerals indicate like parts, the grinding machine comprises a hollow body 1 mounted on any suitable base 2, and having a table 3 extending outwardly at one side. The body is open at the top to receive a circular grinding disk 4, which is provided with any suitable abrasive material on its exposed face. The grinding disk is mounted on a driving shaft 5 journaled in a support bearing 6 in the body; the shaft 5 extending downwardly through a thrust bearing 7 in the body and being provided at its lower end with, preferably, a bevel gear 8. A shaft 10 is journaled in a bearing 9 in the body adjacent the base 2 and carries at one end a bevel gear 11 meshing with gear 8 on the grinding disk shaft 5. The other end of the shaft 10 is preferably connected to an electric motor 12, which upon operation is adapted to rotate the grinding disk 4 through the medium of the shafts 10 and 5 and the meshing gears 11 and 8.

A member 13 is provided to bridge the grinding disk 4. The opposite ends of said member are fastened to the body 1, and carried by bearings 14 and 15 in said member are sprocket wheels 16 and 17 spaced intermediate the grinding disk 4 and the lower side of the member 13. Another member 18 is disposed at right angles to the member 13 and in the same horizontal plane, one end of the member 18 being secured to the body, while at their junction the two members are fastened to each other, preferably by welding. A bearing 19 is provided adjacent one end of the member and is adapted to carry a sprocket wheel 20 disposed in plane with the sprocket wheels 16 and 17.

Carried by the free end of the member 18 is a cross arm 21 provided at its ends with bearings 22 and 23 carrying sprocket wheels 24 and 25, respectively, disposed in the same plane as sprocket wheels 16, 17 and 20.

An endless chain 26 is carried by the sprocket wheels 21, 16, 20, 17 and 25, the wheel 25 being the driver and being driven by an electric motor 27, preferably through a system of gears, as will now be explained.

Keyed to the shaft 28, upon which the sprocket wheel 25 is mounted, is a gear 29 in engagement with a gear 30 mounted on a vertically disposed shaft 31, which also carries a worm gear 32. The worm gear 32 is adapted to be driven by a worm 33 carried by a shaft 34 which also carries a gear 35 that meshes with a gear 36 on the motor shaft 37. It will thus be obvious that as the motor 27 is operated, the driving sprocket wheel 25 will be rotated through the gearing above described, the operation of said sprocket wheel being adapted to cause the endless chain 26 to travel around the several sprocket wheels, hereinbefore mentioned.

Interposed between and secured to the cross arm 21 and the member 13 are two oppositely disposed like members 38. Carried by the upper member 38, as shown in Fig. 2, is a loading device A comprising two spaced guides 39 having inclined ends and disposed above the path of travel of the chain 26. The guides 39 are secured to an H-shaped bracket 41 which in turn is secured to the member 38 and form a T-shaped opening 42 with said bracket, as most clearly shown in Figs. 6, 7 and 8.

Carried by the lower member 38, as shown in Fig. 2 of the drawings, is an unloading device B identical in construction to the loading device A carried by the upper member 38 and as just described.

The chain 26 is provided with a plurality of hooks 43, preferably equally spaced, each of said hooks being adapted to carry a piston ring holder and ring over the surface of the grinding disk 4, as will be more fully explained hereinafter. The piston ring holder is shown in Figs. 4 and 5 and comprises a body portion 44 having a vertically disposed stem 45 of a diameter such as to permit rotation in the recess 46 of the hooks 43. The upper end of the stem is provided with a button-shaped head 47 which is adapted to engage the upper faces of the guides 39 of the loading and unloading devices, the stem being adapted to pass between said guides.

Projecting from the body portion 44 of the piston ring holder are a plurality of arms 48 and an arm 49, preferably equally spaced and adjustably held in the body by set screws 50. The arm 49 is of a telescopic character, comprising an outer hollow tubular member 51 which is adapted to be engaged by the set screw 50. Carried in one end of the member 51 is a plunger 52 and interposed between the inner end of said plunger and a plug 53 having screw-threaded engagement in the member 51, is a spring 54 tending to push the plunger 52 out of the member 51. An operating lever 55 extends through an opening in the plunger 52 and is fulcrumed on a pin 56 in the plunger. One end of the lever extends into an aperture 57 in the member 51, while the opposite end extends through a slot 58 formed in the member 51. It will thus be evident that if the free end of the lever 55 is moved toward the body portion 44 of the ring holder, the end in the aperture becomes a fixed pivot and the plunger 52 is pulled into the hollow member 51, thereby compressing the spring 54, but if the lever 55 is not thus operated, the spring 54 urges said plunger outwardly.

The plunger 52 is provided at its outer end with a jaw adapted to operate in a slot 62 in the member 51 and has a surface 59 adapted to engage one side of the piston ring, and a projecting lip 60 adapted to engage the inner surface of a piston ring, the lip 60 being preferably undercut so as to engage the piston ring at substantially one line. The arms 48 are likewise provided on their outer ends with a jaw having a surface 59 and lip 60 of the same construction, and it is therefore deemed unnecessary to show their construction in detail in the drawings.

To apply a piston ring 61 to the holder, the plunger 52 is pulled into the member 51 by operating the lever 55. The piston ring is then placed in the jaws of the arms 48 and the arm 49 so as to engage the surface 59, after which, pressure is removed from lever 55. The spring 54 then projects the plunger 52 outwardly, causing the edge of lip 60 of arm 49 to engage the inner surface of the ring and pull the ring into engagement with the corresponding lip of the arms 48. The pressure of said spring acting through the lip 60 on the arms 48 and 49 is adapted to lightly hold the ring in the holder, but it is not sufficient to cause any distortion of the ring. It should further be noted that the total weight of the piston ring holder, which in operation, as will hereinafter be more fully described, is supported by the ring at only three points in the present instance, is also such as not to cause any distortion of the ring.

With a piston ring 61 mounted in the piston ring holder as just described, the holder with ring is placed on the table 3 adjacent the outer side of the chain 26. With the chain 26 being run by the motor 27 in the direction shown by the arrow D, a hook 43 on the chain moves into engagement with the piston ring holder in such a manner that the ring holder stem 45 enters the recess 46 in the hook. The holder is then moved by the hook into engagement with the loading device A, the holder stem 45 passing between the members 39 and the button-shaped head 47 of the holder engaging the inclined surfaces 63, which raises the holder and ring 61 out of engagement with the table 3. When the holder reaches the other end of the loading device, it descends the inclined surface 64 on the members 39 and is bodily deposited upon the grinding disk 4. The ring and ring holder are then pulled over the surface of the disk 4 in a path governed by the chain 26 until the unloading device B is reached. At this point the inclined surfaces 64 of the unloading device engage the head 47 of the ring holder, lifting said holder and the ring 61 out of engagement with the disk 4. The ring holder then is pulled along the guides 39 to the descending inclined surfaces 63, which permits the ring holder to drop back into engagement with the table 3, after which the ring holder is disengaged from the chain hook 43 by the operator.

As a piston ring 61 is pulled over the grinding disk 4 in the manner just described, the disk 4 is rotated by the electric motor 12. The surface speed of the grinding disk 4 is greater where it engages the piston ring farthest from the center of the disk than where it engages that portion of the ring closest to the center of the disk and due to this difference in grinding speed on the ring, the ring is caused to rotate in the same direction as the grinding disk 4 is rotated. Due to this constantly changing position of the piston ring 61 in relation to the disk 4, the degree of grinding on the whole surface of the ring is equalized and produces a flat ground surface. Even if the grinding disk is not flat or may have ridges, the result is the same, since all portions of the ring are subjected to the same inequalities of the grinding disk during the grinding process.

It will be noted that the chain 26 is provided with a plurality of hooks 43 so that a number of rings may be pulled over the grinding disk at one time, the number, however, varying with the size of rings to be ground. The rings may be of such a size that every alternate hook must be inoperative, as shown in Fig. 2. However, if the rings are sufficiently small, every hook may be used, in which case a smaller holder might also be employed if the holder size were not adjustable to the smaller ring. In case of larger rings, two or even more adjacent hooks might have to be skipped.

The sprockets 16, 20 and 17 are arranged in such a relation to the grinding disk 4 as to obtain the maximum length of chain travel over the disk and at the same time to subject as much of the grinding surface of the disk, as possible, to grinding action in order to cause substantially even wear of the disk.

It will be noted from the construction and operation of the grinding machine as hereinbefore described, that the ring with holder is bodily deposited upon the grinding disk by the loading device A and bodily lifted from the grinding disk by the unloading device B. Although the loading device is not as essential as the unloading device, and in some cases may not be employed, the principal object of using both is to prevent grinding of the ring to occur when the ring is not rotating. It is necessary to have practically all of the ring on the grinding disk to cause rotation, so that, especially in unloading, if the unloading device B were not used, then just as soon as a sufficient portion of the ring was pulled off the disk onto the table 3 to cause rotation to cease, the portion of the ring still in engagement with the grinding disk would be subjected to further grinding and thereby defeat the purpose of the machine.

It will further be noted that the obtaining of a ring with a flat side is especially due to the rotation of the ring on the grinding disk, in addition to using a ring holder of such weight as not to cause any distortion of the ring, and is not dependent upon the condition of the rough cast ring or the flatness of the grinding disk.

With the type of ring holder shown in Fig. 4, it is necessary for the operator to remove the holder from the chain pusher 43 after the holder leaves the unloading device B. If desired, the ring holder may be made as shown in Fig 9, and with other slight modifications of the machine, as will hereinafter be described, the ring holder will automatically slide out of engagement with the chain hook 43 after the ring holder leaves the unloading device B.

As shown in Fig. 9, the modified form of ring holder is substantially the same as the preferred form hereinbefore described, and differs only in that the body is provided with a stem 70 having a collar 71 provided intermediate the body and the end of said stem, said collar being disposed beneath the chain 26, when in operation. The same guides 39 are employed for the loading device A and unloading device B but said guides are secured to an inverted U-shaped bracket 72 which is fastened to a member 73 that is adapted to be used instead of the member 38 in the preferred form, this being necessary in order to place the guides 39 closer to the grinding disk so as to accommodate the collar 71 on the ring holder.

This modified form of my invention operates in the same manner as the preferred form until after the ring holder leaves the unloading device.

The table 3 on the body is modified, as shown in Fig. 13, by providing a sloping surface 74 at the end of the unloading device, so that after the ring holder leaves the unloading device, the holder is permitted to slide from the chain hook 43 on to the slope 74 of the table, thereby automatically disengaging itself from the chain hook.

Under certain circumstances, as in the case of a large diameter ring, it may be necessary to have the ring holder supported at more than three points on the ring in order to prevent distortion of the ring One method of obtaining this result is shown in Fig. 11, in which the holder body 44 is provided with two adjustable projecting arms 76 and a third projecting arm 77 of the telescopic type hereinbefore described in the preferred construction. Each of the arms 76 and the arm 77 is provded at its extremity with a tip 78 of reduced cross section, upon which is mounted an equalizing arm 79, a key 80 being provided in the end of each tip 78 to hold the equalizing arm 79 on its respective arm.

Each end of each equalizing arm 79 is provided with a jaw 81 having a flat portion 59 adapted to engage the flat side of a piston ring 82 and a lip 60 which is adapted to engage the inner surface of said ring, the lip 60 being preferably undercut so as to have a line engagement with the ring. Since each equalizing arm has two jaws, the jaws on the three equalizing arms provide six points of support for the ring holder on the ring 81.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a grinding apparatus, the combination with a grinding surface, of a device carrying an article to be ground, an endless chain disposed above said grinding surface, means for driving said chain, a hook on said chain adapted to engage said device for driving said device and article over said grinding surface, a loading device cooperating with said chain for bodily placing said carrying device and article on said grinding surface, and an unloading device cooperating with said chain for bodily lifting said carrying device and article from said grinding surface.

2. In a grinding apparatus, the combination with a grinding disk, a body containing said disk, means for rotating said disk, a table associated with said body, an endless chain disposed over said disk and table, means for driving said chain, a clutch device for holding an article to be ground by said disk, a hook on said chain for freely engaging said clutch device and adapted to drive said clutch device over said table and disk, an unloading device at the end of the path of travel of said clutch device over said disk, comprising a pair of arms for lifting the clutch device off of said disk and for permitting said clutch device to be deposited on said table.

3. In a grinding apparatus, the combination with a grinding disk, a body containing said disk, means for rotating said disk, a table associated with said body, an endless chain disposed over said disk and table, means for driving said chain, a clutch device for holding an article to be ground by said disk, a hook on said chain for freely engaging said clutch device and for driving same over said grinding disk and table, a loading device comprising a pair of arms for raising the clutch device off of said table and for permitting said clutch device to be deposited on said grinding disk, and an unloading device comprising a pair of arms for raising said clutch device off of said grinding disk and for permitting said clutch device to be deposited on said table.

4. In a grinding apparatus, the combination with a rotatable grinding disk, a body containing said disk and means for driving said disk, a table associated with said body, a framework secured to said body and extending over said grinding disk and table, a plurality of sprocket wheels including a driver carried by said frame work, an endless chain disposed on said sprockets, means for driving said chain through said driver sprocket, devices carrying articles to be ground by engagement with said grinding disk, and a plurality of hooks mounted on one side of said chain for engaging said devices and driving same from said table on to said grinding disk and from said grinding disk on to said table.

5. In a ring grinding apparatus, the combination with an abrasive element, a chain having a hook and operative to travel over said element, a carrier operative by said hook for propelling a ring across said element, and devices cooperating with said hook for lifting said carrier and ring on to and off of said abrasive element.

6. In a ring grinding apparatus, the combination with an abrasive element, a chain having a hook and operative to travel over said element, a carrier operative by said hook for propelling a ring across said element, and devices cooperating with said hook for lifting said carrier and ring on to and off of said abrasive element, said carrier comprising a body supported by said ring and having driving engagement with said ring, a driving member mounted on said body and adapted to be engaged by said hook, and means on said member for cooperating with said devices in lifting said carrier and ring on to and off of said abrasive element.

DE WITT L. SHELLY.